No. 681,287. Patented Aug. 27, 1901.
W. O. WORTH.
SPEED REGULATOR FOR EXPLOSIVE ENGINES.
(Application filed June 19, 1899.)

(No Model.) 8 Sheets—Sheet 1.

Fig. 1.

Witnesses:
Inventor:
William O. Worth,
By Jorée Bain
Attorneys.

No. 681,287. Patented Aug. 27, 1901.
W. O. WORTH.
SPEED REGULATOR FOR EXPLOSIVE ENGINES.
(Application filed June 19, 1899.)
(No Model.) 8 Sheets—Sheet 3.

Fig. 3.

No. 681,287. Patented Aug. 27, 1901.
W. O. WORTH.
SPEED REGULATOR FOR EXPLOSIVE ENGINES.
(Application filed June 19, 1899.)

(No Model.) 8 Sheets—Sheet 6.

Witnesses:

Inventor:
William O. Worth,
By Jonée Bain
Attorney.

No. 681,287. Patented Aug. 27, 1901.
W. O. WORTH.
SPEED REGULATOR FOR EXPLOSIVE ENGINES.
(Application filed June 19, 1899.)
(No Model.) 8 Sheets—Sheet 7.

No. 681,287. Patented Aug. 27, 1901.
W. O. WORTH.
SPEED REGULATOR FOR EXPLOSIVE ENGINES.
(Application filed June 19, 1899.)
(No Model.) 8 Sheets—Sheet 8.

UNITED STATES PATENT OFFICE.

WILLIAM O. WORTH, OF CHICAGO, ILLINOIS, ASSIGNOR OF TWO-THIRDS TO WILLIAM R. DONALDSON, OF LOUISVILLE, KENTUCKY, AND HENRY W. KELLOGG, OF BATTLECREEK, MICHIGAN.

SPEED-REGULATOR FOR EXPLOSIVE-ENGINES.

SPECIFICATION forming part of Letters Patent No. 681,287, dated August 27, 1901.

Application filed June 19, 1899. Serial No. 721,078. (No model.)

*To all whom it may concern:*

Be it known that I, WILLIAM O. WORTH, a citizen of the United States, residing at the city of Chicago, county of Cook, and State of Illinois, have invented certain new and useful Improvements in Explosive-Engines; and I do hereby declare the following to be a full, clear, and exact description of the invention, such as will enable persons skilled in the art to which it appertains to make and use the same.

My invention relates to improvements in explosive-engines, and especially that type of engines wherein gas or vapor under pressure is used as a fuel, and has reference more particularly to that class of engines that are adapted to portable use—such, for instance, as those that are designed to be employed for propelling motor-vehicles, traction-engines, and the like. It is not limited, however, to engines for portable use. The essential elements, associated and combined in the manner hereinafter described, may with equal value, organized as they are, be employed for either portable or stationary duty.

One object of my invention is to improve generally the construction and methods of operation of gas or vapor engines of the character above described, whereby much higher economy in the consumption of fuel for a given power produced is attained.

Another object of my invention is to improve the construction and operation of engines of this class so that the continuity of operation may be maintained throughout long periods of time and to eliminate spasms of irregularity so commonly observed in the operation of gas-engines as a class.

With these and other objects in view the invention consists in the novel constructions and combinations of parts hereinafter more fully described, and particularly pointed out in the appended claims.

In the accompanying drawings, Fig. 13 is a longitudinal broken-away detail of the air-valve in section. Fig. 14 is a cross-section of same, taken through line 14 of Fig. 13.

Like letters refer to similar parts in all of the views.

The engine which I have illustrated for the purpose of describing my invention is one of the double four-cycle type—that is to say, it is an engine of the four-cycle type—a cylinder being placed on each side of the crank-shaft, making it a double engine, one impulse being produced by every revolution of the shaft, but occurring alternately in each cylinder. I realize the necessity of purging the cylinder of all the products of combustion after each and every explosion therein, and this I do in addition to the usual exhaust of such gases by causing a draft of fresh cool air to sweep the cylinder at the end of the succeeding stroke after each explosion. The non-combustible gases are first exhausted and then further expunged by large quantities of pure air being blown through the cylinder, leaving the cylinder clean of all undesirable gases.

Figure 5:
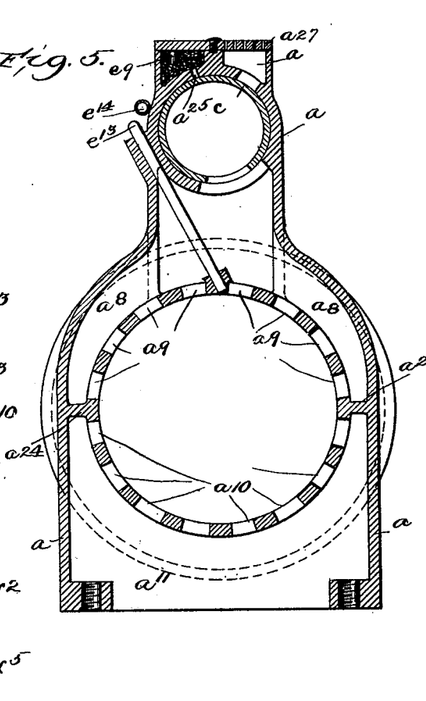
Fig. 5 is a section through line 5 of Fig. 2 looking in the direction shown by the arrows.
Figure 6:
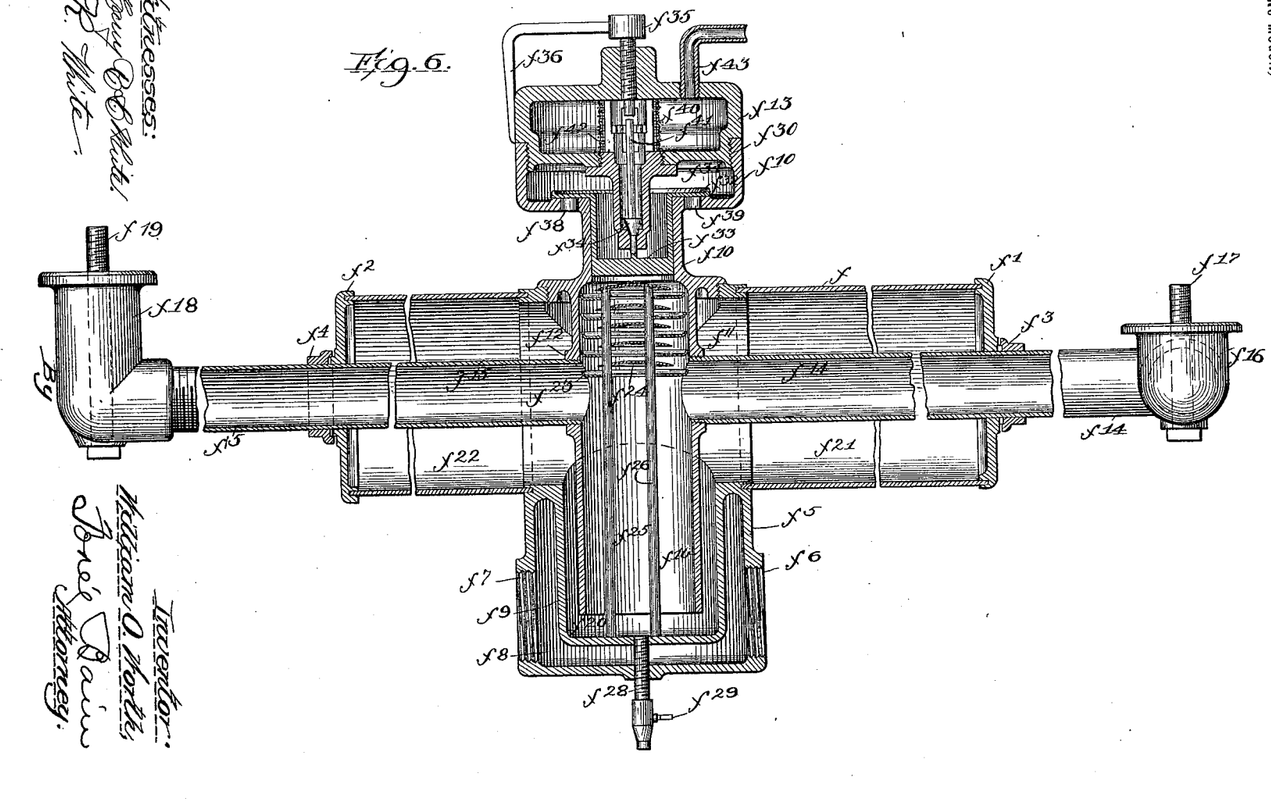
Fig. 6 is a side elevation of a carbureter and mixer, part of which is shown in section. This figure is included to assist in illustrating the operation of my engine. The device will be described and claimed in a subsequent application, as required by a division of this case.

Referring to the drawings, $a$ represents the frame or case of a gas-engine, including the cylinders $a'$ and $a^2$. A double-crank shaft $b$ is supported in bearings $a^3$ and $a^4$ of the frame $a$. A fly-wheel $b^3$ is attached to said shaft, a connecting-rod $b'$ connects piston $b^4$ to the crank, and a similar connecting-rod $b^2$ connects piston $b^5$ to the remaining crank of the shaft $b$. By referring to Fig. 3 it will be seen that in virtue of the connection shown both pistons travel coincidently as to time and direction—that is, they both approach the crank end of the cylinder at the same time and they both return to the outside end of the cylinder at the same time. Between the two cranks just referred to a worm-wheel $b^{10}$, having in this case eight (8) threads cut obliquely into its periphery, is firmly attached to the shaft $b$ around disk $b^6$. It engages with a pinion $c'$, the latter being fixed to the air-valve $c$, which is shown in Fig. 13 with the pinion removed. The pinion has in this instance sixteen teeth, so that the air-valve $c$ makes one revolution to every two revolutions of the shaft $b$, and thus each piston $a'$ and $a^2$ makes two reciprocations to each revolution of the air-valve $c$. The air-valve $c$ is approximately as long as each cylinder $a'$ and $a^2$. It extends longitudinally parallel therewith and turns freely within air-valve cylinders $a^5$ and $a^6$ and is provided with bearings therein and closed with caps $c^2$ and $c^3$ at its respective ends. The air-valve $c$ is a hollow cylinder, terminating in a hollow shaft near its center, upon which the pinion $c'$ is fixed. Referring to Figs. 13 and 14, the ribs $c^4$ connect the cylindrical portion with the shaft portion of the air-valve, and this construction provides an air-space through the body of the valve $c$ into the crank-box $a^7$ of the case $a$. Ports $c^5$ are cut through the wall of the cylinder $c$ and correspond with other like ports $c^6$, which are cut through the wall of the cylinder $a^5$. They also match other ports $c^7$, which are cut through cylinder $a^5$ into air-chamber $a^8$, which is located between the said cylinder $a^5$ and cylinder $a'$. The chamber $a^8$ communicates with cylinder $a'$ by ports $a^9$. There are other ports $a^{10}$ in the same cylinder that communicate with the open air when the piston is in position shown in Fig. 2 through space $a^{11}$. The ports $a^9$ and $a^{10}$ are separated by partitions $a^{23}$ and $a^{24}$, Fig. 5. A deflector $b^{20}$ is attached to the head of each piston, so as to direct the blast of cold air more thoroughly through the body thereof.

It may be well to state here that the mechanism and all parts thereof of the one side of the engine are duplicated on the other side, with the exception that on one side piston $c^{34}$ of the multiport valve is operated by an eccentric $c^{12}$ and by a crank $c^{11}$ on the other side. I have indicated the two constructions simply to show that either may be employed.

In the air-tight containing-case $a$, which surrounds the pistons and in which shaft $b$ has bearings, I provide a chamber $a^7$. This chamber is opened through the valve $c$, between ribs $c^4$, into the cylinder portion thereof, from thence either through ports $c^6$ to the atmosphere or through ports $c^7$ to chamber $a^8$, and thence through cylinder $a'$ to the atmosphere. When the passage-way is closed, the displacement caused by the two pistons being drawn into the chamber $a^7$ at the same time causes the air therein to occupy less space, and thereby a pressure somewhat above the atmosphere is produced.

The air-valve $c$, Figs. 13 and 14, consists of a long double cylinder, terminating at its center in a hollow shaft, upon which pinion $c'$ is fixed, by which the shaft receives its rotary motion. It makes one revolution while the crank-shaft $b$ is making two revolutions. There is an air-valve $c$ for each working cylinder, coaxially located. Ports $c^5$ are cut through the walls of each air-valve; but the said ports are located on opposite sides of the axis. Ribs $c^4$ join the cylinder portion and the shaft portion of the valve $c$. Fig. 14 shows a section through the rib portion and the air-passages between the ribs.

$c^6$ is a small cylindrical extension of the valve $c$, upon the outer end of which the governor is attached by means of screw-threads $c^7$. The governor is mounted upon the cup-shaped disk $c^{13}$. The eccentric $c^{12}$ and lug $c^7$ are made integral therewith. The upper end of this casting forms a guide for the rod $d$ and a guide for the telescoping tube $c^{14}$. The upper end of the latter extends above the links $c^{24}$ and $c^{25}$ and has a swivel attachment $c^{19}$ to lever $c^{21}$. This lever is attached to the case $a$ at $c^{20}$ by stud $a^{23}$ and can be retained in position by means of link $c^{22}$ and screw $c^{23}$. This device is shown in a conventional manner for sake of clearness. By this means $c^{14}$ may be raised and lowered on the stem of $c^{13}$, as described. Two arms $c^{15}$, carrying pins $c^{18}$, are fixed on $c^{14}$. The governor-springs $c^{17}$ are flat steel pieces attached on opposite sides of disk $c^{13}$ and terminate in two large balls $c^{16}$. The tension of these springs is regulated in virtue of the position of the arms $c^{15}$ and pins $c^{18}$, through which the springs $c^{17}$ pass. The governor-balls are loosely connected to cross-arm $c^{26}$ by links $c^{24}$ and $c^{25}$, respectively. The cross-arm $c^{26}$ is fixedly attached to the rod $d$ by a pin passing through the arm and rod. By this means the rod $d$ is revolved, and when the governor-balls $c^{16}$ fly out, as a result of speed, the rod $d$ is thereby advanced or retarded to that extent in its revolution by the links $c^{24}$ and $c^{25}$, twisting the cross-arm $c^{26}$, to which the rod $d$ is attached. It will be noticed that the rod $d$ may be thus turned back rotatively in position with reference to air-valve $c$ as the speed increases or advanced to its normal or beyond its normal position as the speed decreases.

Figures 7, 8:
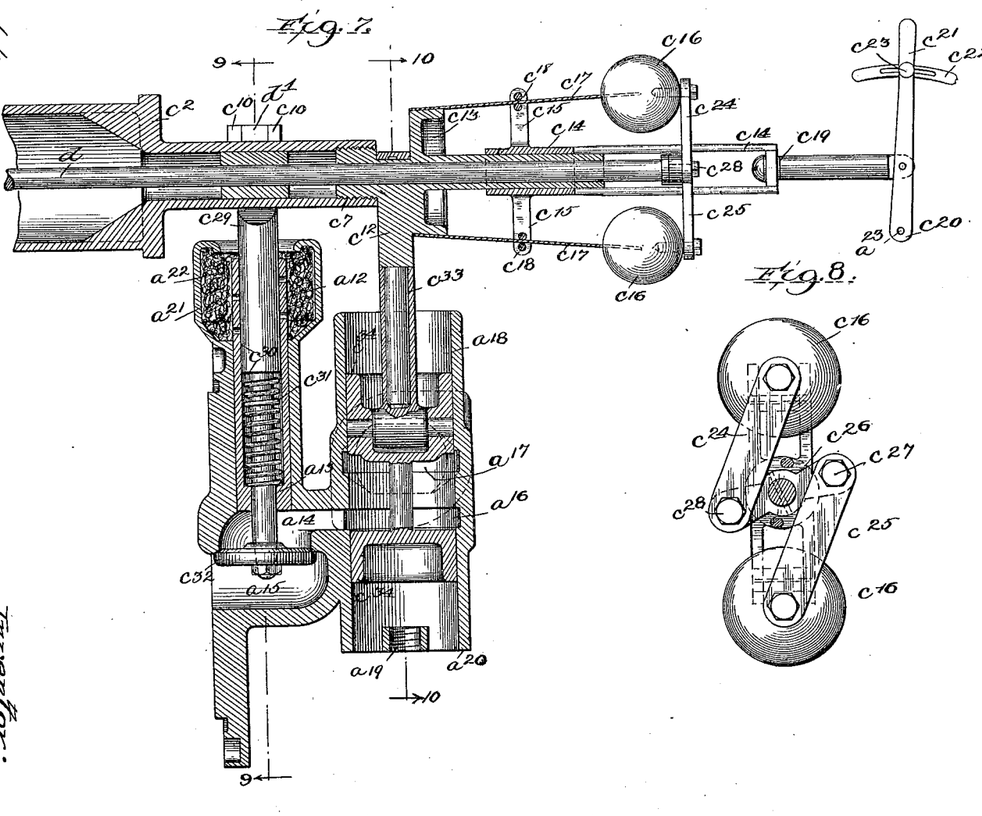
Fig. 7 is a detail view in section of the fly-ball governor, rod, puppet cut-off valve, piston, and a portion of the air-valve.
Fig. 8 is a plan view of the governor, showing the connections of the governor with the governor-rod.
Figure 9:
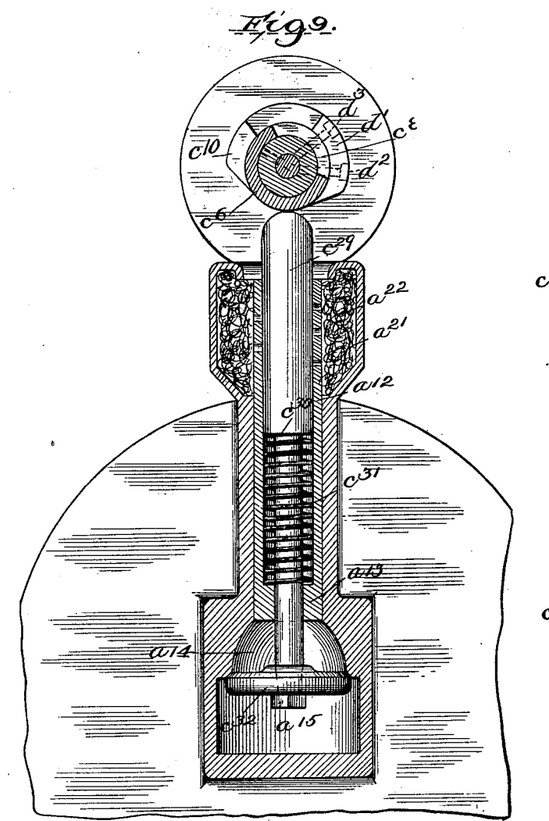
Fig. 9 is a detail section of the puppet-valve, taken through line 9 of Fig. 7 looking with the arrow and showing the cam for operating the valve.
Figure 10:
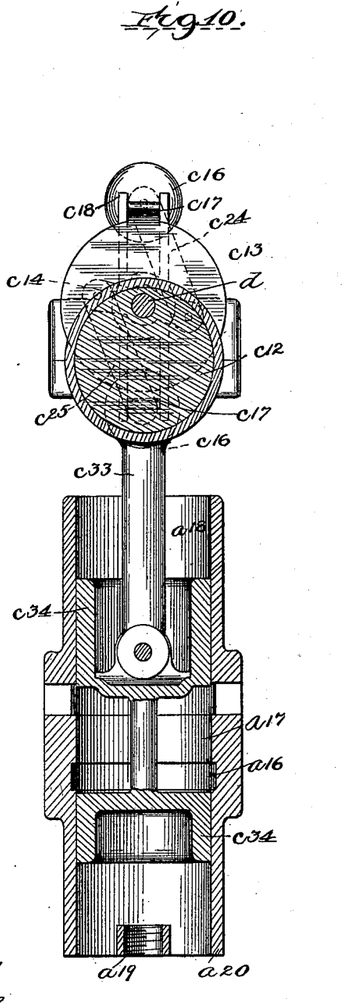
Fig. 10 is a detail section of the piston multiport valve, taken through line 10 of Fig. 7 in direction of the arrow, showing the eccentric by which it is connected to the air-valve.
Figure 11:
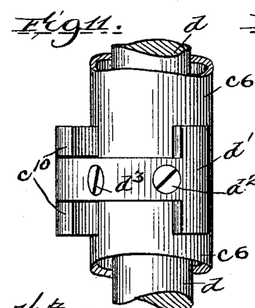
Fig. 11 is a detailed broken-away portion of the air-valve stem and the governor-rod therein with a part of the controlling-cam attached to each. The cam is shown open.
Figure 12:
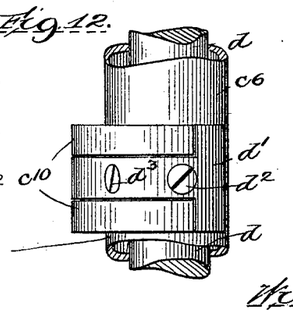
Fig. 12 is a similar view with the cam shown closed.

Referring now to Figs. 9 and 13, a slot $c^3$ is shown cut through the wall of the smaller cylinder extension $c^6$, which extends around about one-third of the circumference of the said cylinder. A T-shaped cam-piece $d'$ (shown more plainly in Figs. 11 and 12) is attached to the governor-rod $d$ by screws $d^2$ and $d^3$. The said screws pass through the slot $c^8$ and enter the collar, that in turn is fixed to the shaft $d$. A U-shaped cam-piece $c^{10}$ is directly fixed to $c^6$. Between the legs of the latter the extension of cam-piece $d$ is adapted to pass, as shown in Fig. 12. The positions shown in Figs. 11 and 12 and any intermediate position of the two cam-pieces $c^{10}$ and $d'$ may be obtained by turning either shaft $d$ or cylinder $c^6$ on its axis with reference one to the other. The object of this compound cam is to hold the puppet-valve $c^{32}$ open. It is made adjustable, so that the time that the puppet-valve may be so held open may be varied as circumstances may require. One element $d'$ is attached to the valve-shaft and the other element to the air-valve, so that the length of the cam formed or made up of these two elements is determined by the relative rotary positions of the air-valve $c$ and the valve-shaft $d$. The puppet-valve $c^{32}$ is attached to stem $c^{29}$ and is held normally against its seat by an open spiral spring $c^{31}$, the latter being confined within the sleeve $a^{13}$, between the bottom thereof and the shoulder $c^{30}$ of the rod $c^{29}$. The upper end of the sleeve $a^{13}$ is perforated radially with small holes $a^{12}$ for admitting the lubricant to the rod $c^{29}$. A cup-shaped extension $a^{21}$ is formed around the upper portion of the sleeve $a^{13}$ and contains waste or the like, into which the lubricating-oil may be poured or dropped from time to time. When the air-valve $c$ is revolved upon its axis and when in position shown in Fig. 9, the valve $c^{32}$ is closed and is not disturbed. The cam, however, when it reaches the proper point in its revolution will depress the stem $c^{29}$ against the resilient force of spring $c^{31}$ and hold it open for a time during that portion of the circumference over which the cam may at that particular time be extended or opened. In Fig. 11 the cam is in position to hold the valve open for a maximum time. Fig. 12 shows the cam closed up, in which position it would hold the valve open for a minimum time. Between these two positions the time that the valve may be held open may be varied by the relative positions of the cam elements. A piston cam-valve $c^{34}$, Fig. 7, is adapted to be reciprocated within cylinder $a^{18}$ by means of the eccentric $c^{12}$, which is fixed to air-valve $c$. Eccentric strap and rod $c^{33}$ connect the said piston and eccentric together. The piston therefore makes one double stroke for each revolution of the air-valve. The piston is divided into two parts which straddle the ports $a^{16}$ and $a^{17}$ in the cylinder $a^{18}$, but are fixedly connected together by a small shaft, as shown. The cylinder $a^{18}$ is adapted to be connected to the carbureter at the end $a^{20}$ by means of the central threaded hub $a^{19}$.

Figure 1:
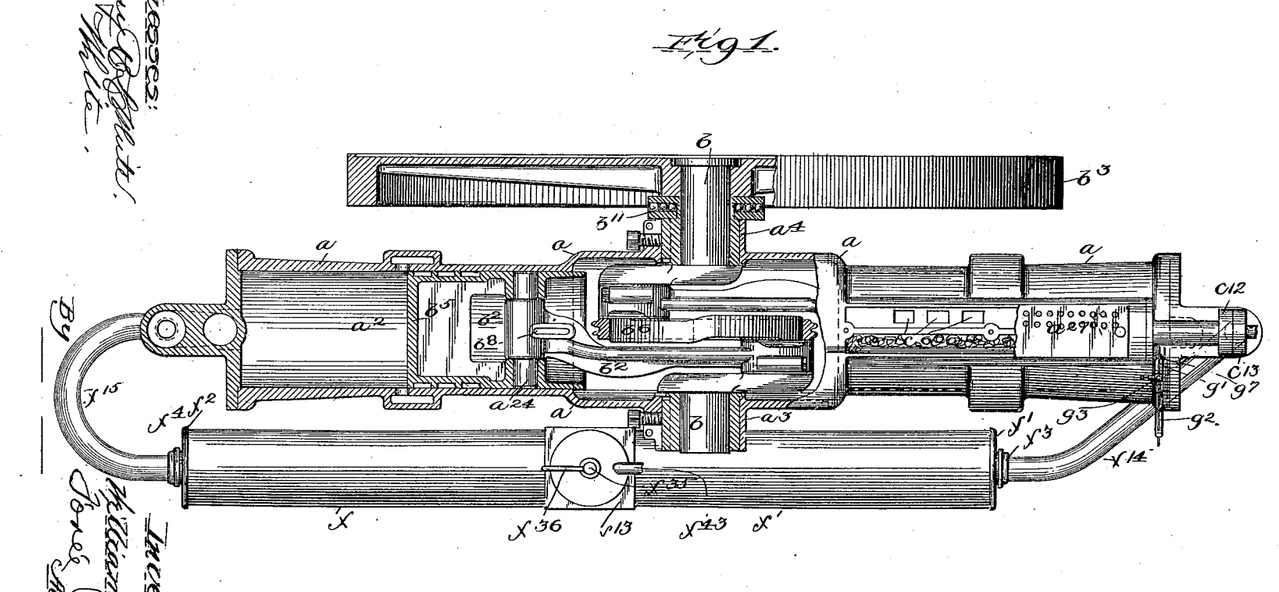
Figure 1 is a plan view of the engine part in horizontal section and showing a part in perspective.
Figure 2:
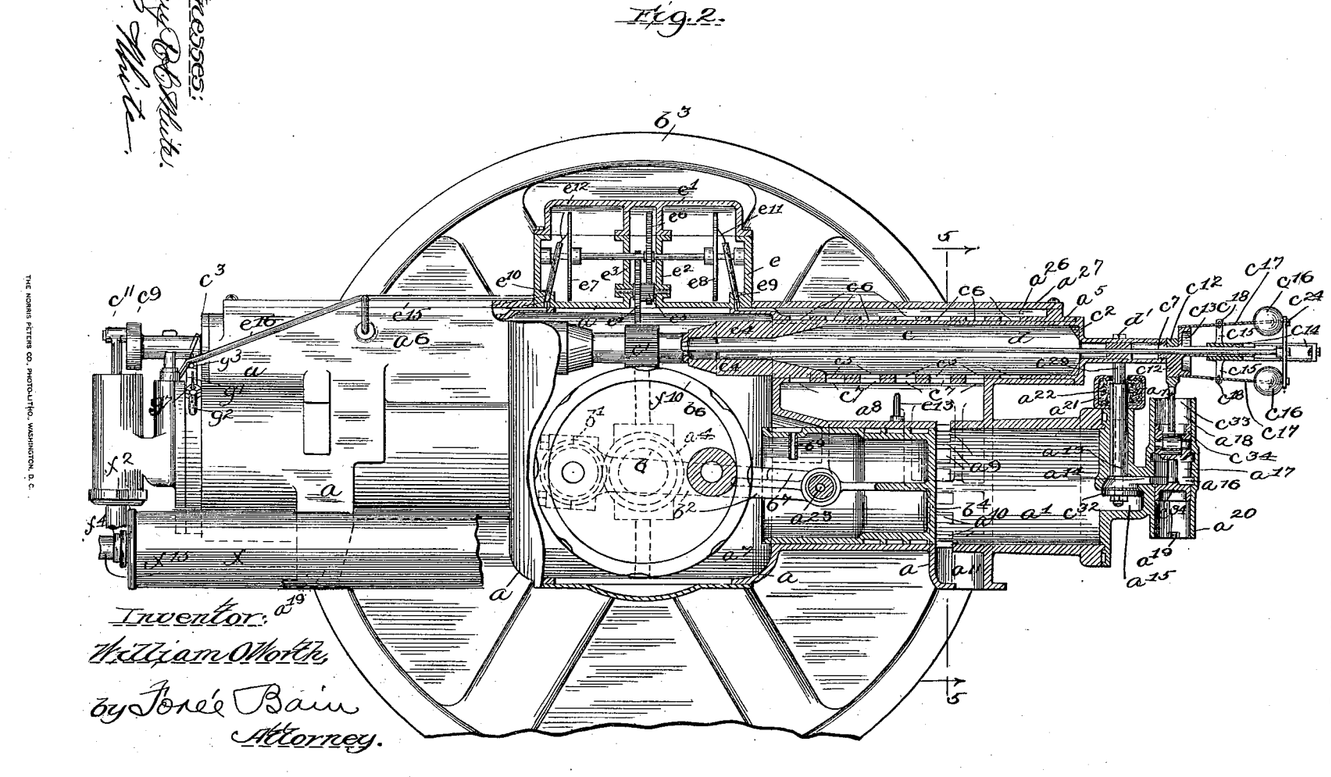
Fig. 2 is a similar view of a side elevation of the engine.
Figure 3:
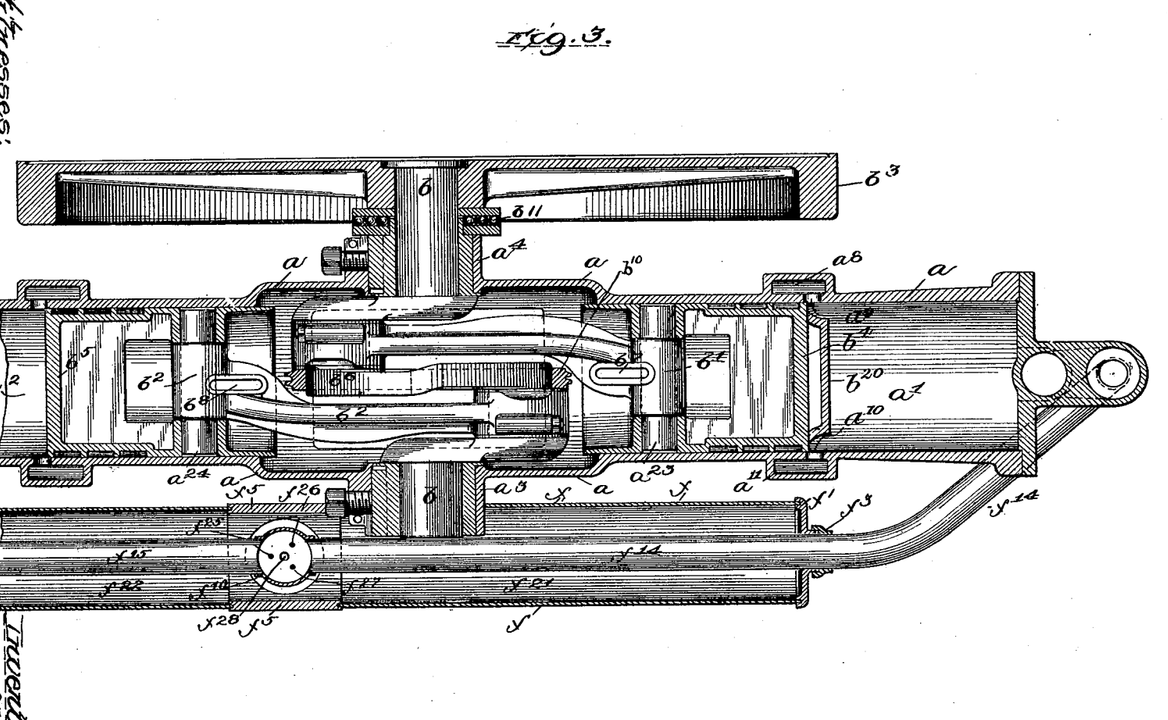
Fig. 3 is an enlarged plan in section broken away and showing about two-thirds of the engine.
Figure 4:
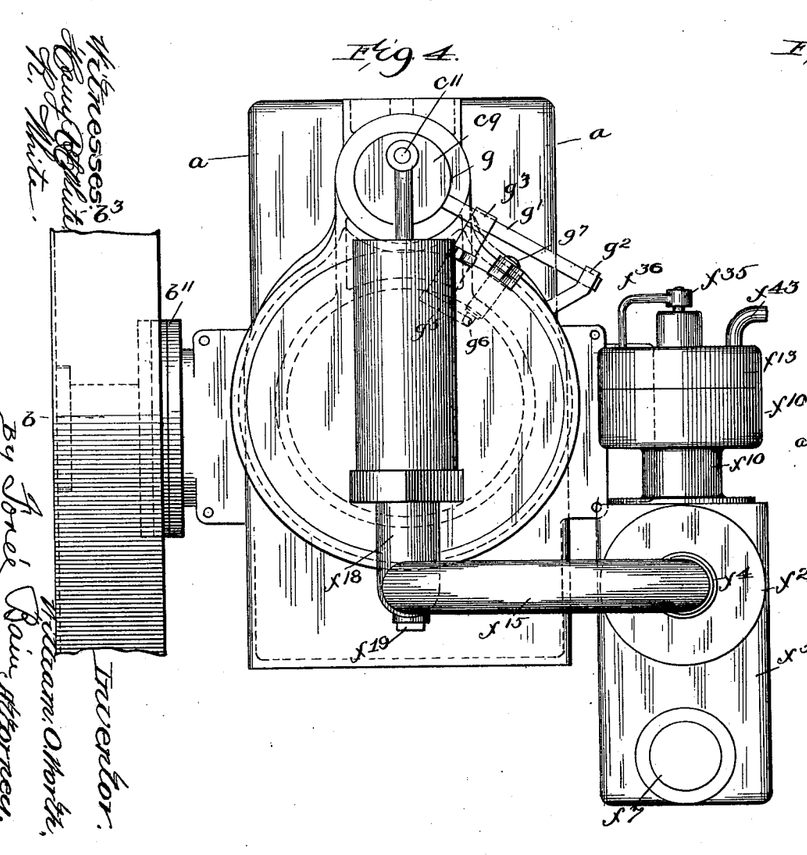
Fig. 4 is an enlarged end elevation of Fig. 1, showing the carbureter and mixer attached.

The operation of my engine is as follows: In Figs. 1, 2, and 3 the pistons have been drawn back from their respective cylinders. Referring more particularly to Fig. 2, in virtue of the position of the piston in the cylinders the air-space in case $a^7$ has been contracted, and thereby produced an air-pressure therein equal to something above the atmosphere just previous to the time that the air-valve $c$ has arrived in position shown or before the ports $c^5$ thereof have come coincident with ports $c^7$ of the air-chamber $a^8$. In the position now shown the air from case $a^7$ is passing through valve $c$, between the ribs $c^4$, (see Fig. 14,) into the cylinder portion, through ports $c^5$ and $c^7$ into chamber $a^8$, and from there through port $a^9$, where the air will strike a deflector $b^{20}$, which is attached to the head of piston $b^4$, and is thereby deflected into the body of the cylinder. Ports $a^{10}$ are open now to the atmosphere and through these this charge of air and attenuated gases will find its exit through passage $a^{11}$. By this means the cylinder $a'$ has been purged of most of the products of combustion and at the same time has been cooled very materially by this draft of fresh cool air. While this is taking place in cylinder $a'$ in cylinder $a^2$ a different cycle is being performed. The portion of valve $c$ lying parallel with cylinder $a^2$ now occupies a position equivalent to one half-revolution in advance of that portion of the valve $c$ just described. In other words, the ports in the valve $c$ of cylinder $a^2$ are now opposite ports $c^6$ of cylinder $a^5$ and ports $c^7$ thereof are closed. As piston $b^4$ moves forward, valve $c^{32}$ will be opened by compound cam $c^{10}$ and $d'$ depressing stem $c^{29}$ against spring $c^{31}$, Figs. 7 and 9. A passage-way from the cylinder $a'$ is then open for the exhaust of any residuary gases that may yet remain within the cylinder through passages $a^{15}$ $a^{14}$ $a^{16}$ to exhaust $a^{17}$. In Fig. 7 it will be seen that the eccentric $c^{12}$ is raising the piston $c^{34}$ in cylinder $a^{18}$, which will cover the port $a^{16}$ just about the time piston $b^4$ starts on its return stroke. Before the piston $b^4$ completes its return stroke the piston $c^{34}$ will have been raised above port $a^{16}$ and a charge of gas or vapor will have been drawn into cylinder $a'$ from the carbureter, which is connected to $a^{20}$ by means of threaded boss $a^{19}$ and screw $f^{17}$, as before explained. Bear in mind now that valve $c^{32}$ is still open, even though the cams $c^{10}$ and $d'$ are in position shown in Fig. 12. The suction produced by piston $b^4$ creates a partial vacuum in cylinder $a'$ during the time that piston $c^{34}$ covers port $a^{16}$. As soon as the port $a^{16}$ is uncovered, as described, the vapor-gases from the carbureter and mixer will rush in and fill cylinder $a'$. The operation of the carbureter and mixer at this time is as follows: If there is a sufficient supply of the mixture of gases and air contained therein, there will not be any new mixture produced at this stroke of the engine; but if the vacuum effect in cylinder $a'$, just described, reaches the carbureter piston $f^{32}$ it will be raised by the suction, or in virtue of the pressure within the carbureter being lower than that of one atmosphere air-ports $f^{38}$ and $f^{39}$ will be thereby uncovered and air in the desired quantity will rush therein and at the same time that piston $f^{32}$ is raised in the manner described, cross-bar $f^{33}$ thereof will strike valve-stem $f^{41}$ and open the valve formed by $f^{34}$ and $f^{41}$, and thereby admit a few drops of gasolene, when such is used, from chamber $f^{40}$. This liquid will fall upon the upper convex disk $f^{24}$, over which it will spread, the excess will drop on the next succeeding disk $f^{23}$, over the surface of which it will likewise spread, and the excess will again fall below through a central hole to the next succeeding disk, and so on. Should there be more liquid gasolene than the charge of air will otherwise absorb, the excess of liquid will fall from the lower disk onto the floor of the closed cylinder $f^9$, which is kept hot by a portion of the exhaust passing through pipes that are connected with case $f^5$ at $f^6$ and $f^7$. Spaces $f^{21}$ and $f^{22}$ are receivers for the mixed gases, into which the said gases may be stored to be drawn on when required. Returning to the engine, the piston $b^4$ has now again reached the position shown in the drawings in Fig. 2, but the air-valve $c$ has made one half-revolution, and now ports $c^7$ are thereby closed and ports $c^5$ are in a position to register with ports $c^6$, and of course air-valve $c$ has also reversed its position with reference to cylinder $a^2$. Cylinder $a'$ is filled with an explosive mixture, which was drawn in from the carbureter and mixer, as just described. Puppet cut-off valve $c^{32}$ is still open and piston $c^{34}$ is above the port $a^{16}$. When the piston $b^4$ again starts to move forward, it shoves a portion of the gases that have been taken in from the carbureter back into the carbureter through the passages $a^{15}$, $a^{14}$, $a^{16}$, and $a^{20}$ and will continue to do so as long as valve $c^{32}$ is depressed by the compound cam $c^{10}$ $d'$. As soon as the valve $c^{32}$ is closed by being released by the aforesaid cam the charge remaining within the cylinder is compressed by the continued excursion of the piston $b^4$, and when the compressor has reached its maximum effect the charge is fired by the electric igniter, and an impulse is thereby imparted to the revolving elements of the engine.

As before described, the cylinder is filled with the explosive mixture, which is taken from the carbureter during the return stroke of the piston, and the gases therein contained are pushed back into the carbureter during its outward stroke until the valve $c^{32}$ is closed by operation of the cam $c^{10}$ $d'$. The closing of the valve $c^{32}$ may occur at any time during the outward stroke of the piston $b^4$. The sooner the valve is closed during this cycle of the crank or journey of the piston the greater amount of gas mixture will be left in the cylinder and the greater will be the compression of the said gases within the said cylinder, as it is of course understood that the piston travels a definite distance during each stroke and the explosion will be more violent and impulse more powerful. The operation of the compound cam $c^{10}$ $d'$ to vary the time that valve $c^{32}$ remains open will be explained by reference to Figs. 7 and 8.

The fly ball-governor is directly attached to the valve $c$ and is rotated thereby. The balls $c^{16}$ thereof are connected to the cross-arm $c^{26}$ by the links $c^{24}$ and $c^{25}$. The cross-arm is fixed to the internal shaft $d$, which is free to turn in and passes entirely through the valve $c$. The element $d'$ of the compound cam is fixed to the rod $d$ by a screw, which passes through the slot $c^8$ of the valve $c$. The element $d'$ of the compound cam may be advanced circumferentially about ninety degrees with respect to the element $c^{10}$, which latter element is attached to the valve $c$ when the governor-balls are extened laterally, as when the speed of the engine increases. By this means the valve $c^{32}$ will be held open for a longer time with a high speed than when the speed is lower. The stem $c^{29}$ of the subsidiary valve $c^{32}$ bears against both elements of the cam and will be depressed and the valve opened thereby against the resilience of the open helical spring $c^{31}$. The tension of the spring $c^{17}$, controlling the governor-balls $c^{16}$, may be altered by the movement of the stationary lever $c^{21}$. When moved ahead, the arm $c^{15}$, which embraces the springs, is moved nearer the balls, the springs are thereby shortened and their tension increased, so that the engine will regulate at a higher speed, and when the lever $c^{21}$ is moved in the opposite direction the springs $c^{17}$ will be effectively lengthened, and the engine will regulate at a lower speed.

I desire to expressly call attention to the fact that the opposing cylinders on each side of the shaft are arranged so that their axes exactly coincide. There is a very important reason for the disposition of the cylinders as shown. By this arrangement the impulses effected in each cylinder are received by the pistons in a line drawn through the axes of both cylinders. The two cylinders being coaxially located and the impulses being imparted to the pistons when they are traveling in relatively opposite directions—that is to say, when both pistons are leaving their respective cylinders and traveling toward each other—the tendency of one piston to produce a vibration of the engine on its frame is absorbed or neutralized by the opposite piston. The result of this construction is that there is absolutely no vibration attending the operation of my engine and which is so common with engines of this class. The elimination of vibration from the operation of my engine contributes largely to its desirability and value when used as a means for propelling automobile carriages or the like.

I desire it understood that I do not limit myself to the specific details of construction herein shown and described, but reserve to myself the right to make such changes in the form and arrangement of the various features of the apparatus as will fairly fall within the spirit and scope of my invention.

Having fully set forth my invention by drawings and descriptions, what I claim as new, and desire to secure by Letters Patent of the United States, is—

1. An engine comprising a working cylinder, an air-valve cylinder, an air-valve within said air-valve cylinder, a main shaft, a suitable gearing connecting the main shaft with the air-valve for operating the latter, a flyball speed-governor mounted on the said air-valve, a cam loosely mounted on said air-valve, a fuel-inlet subsidiary valve for the working cylinder operated by said cam, a connection between said cam and said speed-governor for changing the travel of the fuel-inlet subsidiary valve, and a multiport valve between the subsidiary valve and the fuel-supply, connected to a moving part of the engine, substantially as set forth.

2. An engine comprising a main shaft, a working cylinder, an air-valve, a fuel-valve, a port between said fuel-valve and cylinder, and internal and external shaft, suitable gearing for connecting one of said shafts to the main shaft, a compound cam adapted to operate the said fuel-valve, one element of the said cam fixed to the external shaft, one element fixed to the internal shaft, and a speed-governor attached to both members of said shaft, substantially as set forth.

3. An engine comprising a working cylinder, an air-valve cylinder, a rotary air-valve within said air-valve cylinder, a suitable gear for rotating said air-valve, a speed-governor connected with the said air-valve, a valve-shaft extending through the said air-valve, connections between the valve-shaft and speed-governor, whereby the latter may cause an angular movement of the valve-shaft relatively to the air-valve, a valve-casing having a port opening into the said working cylinder, and a compound cam for operating the said valve, one element of the said cam fixed to the said air-valve, and one element fixed to the said valve-shaft, substantially as set forth.

4. An engine comprising a working cylinder, a fuel-supply connected with the said cylinder, a multiport valve between the said working cylinder and fuel-supply, a casing for said valve, a port in the said casing communicating with the said cylinder, a port in said casing communicating with the said fuel-supply, a port in said casing opening into the atmosphere and a subsidiary valve intermediate of the multiport valve and the working cylinder, substantially as set forth.

5. An engine comprising a working cylinder, a fuel-supply connected with the said cylinder, a multiport valve between said cylinder and fuel-supply, a casing for said valve, ports in the casing of the said valve communicating with the said cylinder and fuel-supply, a subsidiary valve intermediate of the said multiport valve and cylinder, a compound shaft, gearing for revolving said shaft, a compound cam, separate elements of said cam fixed to the separate members of the said compound shaft, connections between the said cam and subsidiary valve for operating the latter, and a speed-governor for varying the position of the cam, said governor having separate members thereof fixed to separate members of the said shaft, substantially as set forth.

6. An engine comprising a working cylinder, a multiport valve, a casing for said valve-ports in the casing of the said valve opening to the fuel-supply, to the atmosphere and to the subsidiary valve, a subsidiary valve intermediate of the said cylinder and the multiport valve, a spring for holding said subsidiary valve closed, a valve-shaft, a means for rotating said shaft, a two-part cam on said shaft, one element fixed to the said shaft the other element independently supported in position, the stem of the said subsidiary valve within the path of the said cam, and a speed-governor carried by the said valve-shaft and connected with the independently-supported element of the said cam, whereby the said cam may be extended or contracted for varying the time said subsidiary valve remains open, substantially as set forth.

7. An engine comprising a main shaft, a working cylinder, a subsidiary valve, a port between said valve and cylinder, a rotary air-valve, suitable gearing for connecting said air-valve with the main shaft, an internal shaft within said air-valve, a compound cam adapted to operate the said subsidiary valve, one element of said valve fixed to the said internal shaft, one element fixed to the said air-valve, connections between the cam on the said air-valve and the said subsidiary valve, and a speed-governor bodily carried by the said air-valve, the movable member thereof fixed to the internal shaft, whereby the relative position of the cam members may be adjustably varied, substantially as set forth.

8. An engine comprising a working cylinder, an air-valve cylinder, a subsidiary valve, a hollow rotary air-valve within the said air-valve cylinder, an internal shaft within said air-valve, a suitable gearing for rotating said air-valve, connections between said air-valve and said subsidiary valve, a governor bodily mounted upon said air-valve and rotating therewith, the reciprocating member of the governor attached to the said internal shaft, and a two-part extendable cam for operating said subsidiary valve, one of the elements thereof attached to the air-valve, the other element attached to the internal shaft, whereby the relative position of the members of the two-part cam are adapted to be changed by the said governor, substantially as set forth.

9. An engine comprising a working cylinder, a rotary air-valve having its axis parallel with that of the said working cylinder, suitable gearing for rotating said air-valve, a governor attached to said air-valve, a cam-shaft attached to said governor, a two-part cam, one of the elements thereof fixed to the said air-valve and the other element to the said valve-shaft, a valve for the working cylinder held on its seat by a spring, the stem thereof extending into the path of the said two-part cam, whereby the said valve is adapted to be held open by the revolution of the said cam, substantially as set forth.

10. An engine comprising a working cylinder, a hollow shaft associated therewith, a compound cam, a valve actuated by said cam, a speed-governor mounted upon said hollow shaft, a valve-shaft extending through said hollow shaft, a cross-arm attached to one end thereof, each end of the said cross-arm loosely connected to the respective momentum devices of the said governor, whereby the relative rotary position of the said valve-shaft and hollow shaft may be varied, and an element of the said cam attached to the said valve-shaft and adapted to actuate said valve, substantially as set forth.

11. The combination of a cylinder, a piston in the said cylinder, a fuel-supply, a multi-port valve between the said fuel-supply and the said cylinder, a subsidiary valve between the said multiport valve and the said cylinder, connections between the said valve and the moving parts of the engine, an igniter and a governor connected to the said subsidiary valve and the said igniter, and adapted to control the time and extent of the movement of the said subsidiary valve and of the said igniter, whereby the quantity or quality of fuel within the cylinder, and the time of its ignition is determined, substantially as set forth.

In testimony whereof I have signed this specification, in the presence of two subscribing witnesses, this 14th day of June, 1899.

WILLIAM O. WORTH.

Witnesses:
  FORÉE BAIN,
  M. F. ALLEN.